(12) United States Patent
Quast et al.

(10) Patent No.: US 12,570,184 B2
(45) Date of Patent: Mar. 10, 2026

(54) END CAP FOR A RAIL AND LONGITUDINAL ADJUSTER

(71) Applicant: Adient Engineering and IP GmbH, Burscheid (DE)

(72) Inventors: Ingo Quast, Duesseldorf (DE); Erik Sprenger, Wermelskirchen (DE); Turgay Turan, Kerpen (DE)

(73) Assignee: Adient US LLC, Plymouth, MI (US)

( * ) Notice: Subject to any disclaimer, the term of this patent is extended or adjusted under 35 U.S.C. 154(b) by 1225 days.

(21) Appl. No.: 17/310,970

(22) PCT Filed: Mar. 18, 2020

(86) PCT No.: PCT/EP2020/057403
§ 371 (c)(1),
(2) Date: Sep. 2, 2021

(87) PCT Pub. No.: WO2020/187970
PCT Pub. Date: Sep. 24, 2020

(65) Prior Publication Data
US 2022/0161693 A1 May 26, 2022

(30) Foreign Application Priority Data

Mar. 20, 2019 (DE) ..................... 10 2019 107 089.9
Jul. 29, 2019 (DE) ..................... 10 2019 120 364.3

(51) Int. Cl.
*B60N 2/07* (2006.01)
(52) U.S. Cl.
CPC ......... *B60N 2/0722* (2013.01); *B60N 2/0705* (2013.01); *B60N 2205/20* (2013.01)
(58) Field of Classification Search
CPC . B60N 2/0722; B60N 2/0705; B60N 2205/20
See application file for complete search history.

(56) References Cited

U.S. PATENT DOCUMENTS

| | | | | |
|---|---|---|---|---|
| 5,209,447 A | * | 5/1993 | Yokota | ................. F16C 29/082 248/429 |
| 7,815,159 B2 | * | 10/2010 | Moriyama | ........... B60N 2/0725 248/430 |

(Continued)

FOREIGN PATENT DOCUMENTS

| | | |
|---|---|---|
| CN | 201808469 U | 4/2011 |
| CN | 203211124 U | 9/2013 |

(Continued)

OTHER PUBLICATIONS

European Patent Office, International Search Report and Written Opinion in Application No. PCT/EP2020/057403, dated Jun. 3, 2020, 10 pages. Rijswijk Netherlands.

(Continued)

*Primary Examiner* — Nkeisha Smith
(74) *Attorney, Agent, or Firm* — Marshall & Melhorn, LLC

(57) ABSTRACT

An end cap for a rail of a longitudinal adjuster has a covering portion, for covering an end-face end of the rail, and a fastening portion, for fastening the end cap to the rail. The fastening portion may be connected to the covering portion forming a four-bar-linkage coupling mechanism. The longitudinal adjuster for a vehicle seat may have at least one pair of rails which is formed from the first rail and the second rail, which is guided displaceably in the longitudinal direction relative to the first rail. At least the first rail or the second rail has at least one opening for the fastening of the end cap for an end of the respective rail. The longitudinal adjuster may have an end cap fastened in the opening.

15 Claims, 5 Drawing Sheets

(56)     References Cited

U.S. PATENT DOCUMENTS

| | | | | |
|---|---|---|---|---|
| 9,102,245 | B2 * | 8/2015 | Mischer | B60N 2/0725 |
| 10,086,721 | B2 * | 10/2018 | Arakawa | B60N 2/0722 |
| 2010/0090083 | A1 | 4/2010 | Kojima et al. | |
| 2014/0042289 | A1 * | 2/2014 | Kawano | B60N 2/0705 |
| | | | | 248/429 |
| 2015/0090854 | A1 * | 4/2015 | Hayashi | B60N 2/08 |
| | | | | 248/429 |
| 2015/0306979 | A1 * | 10/2015 | Hayashi | B60N 2/075 |
| | | | | 248/429 |
| 2019/0061566 | A1 * | 2/2019 | Tsuji | B60N 2/067 |
| 2019/0225119 | A1 * | 7/2019 | Nishio | B60N 2/0722 |
| 2024/0034201 | A1 * | 2/2024 | Fisher, III | B60N 2/02246 |

FOREIGN PATENT DOCUMENTS

| | | | |
|---|---|---|---|
| CN | 104071039 | A | 10/2014 |
| CN | 207860008 | U | 9/2018 |
| DE | 102013205497 | B4 | 2/2015 |
| DE | 102014219233 | A1 | 4/2015 |
| DE | 102018122094 | A1 | 3/2020 |

OTHER PUBLICATIONS

China National Intellectual Property Administration, Office Action in Application No. CN202080022604.X, dated Dec. 19, 2022, 12 pages.

* cited by examiner

END CAP FOR A RAIL AND LONGITUDINAL ADJUSTER

FIELD

The invention relates to an end cap for a rail, in particular of a longitudinal adjuster, having the features of the claims, and to a longitudinal adjuster, in particular for a vehicle seat.

BACKGROUND

DE 10 2013 205 497 B4 discloses a seat rail end cap which is installed at one end of a lower rail of a seat rail arrangement mounted between a vehicle seat and a floor of a vehicle.

DE 10 2018 122 094 A1 discloses a longitudinal adjuster of the type in question, in particular for a vehicle seat, having at least one pair of seat rails which is formed from a lower seat rail and an upper seat rail guided displaceably in the longitudinal direction relative to the lower seat rail, wherein the lower seat rail and the upper seat rail have openings for the fastening of a respective end cap for covering in each case one end of the respective seat rail, and a covering cap which is attached onto the end-face side of the end of the respective seat rail is latched into the opening.

SUMMARY

The invention is based on the problem of improving an end cap for a rail, in particular for increasing compensation for tolerances, and of providing a longitudinal adjuster.

This problem is solved according to the invention by an end cap for a rail, in particular of a longitudinal adjuster, wherein the end cap has a covering portion, for covering an end-face end of the rail, and a fastening portion, for fastening the end cap to the rail, wherein the fastening portion is connected to the covering portion with the formation of a four-joint coupling mechanism.

Owing to the fact that the fastening portion is connected to the covering portion forming a four-joint coupling mechanism, tolerances possibly caused by manufacturing in the distance of the opening from a closing edge of the rail can be compensated for.

A joint, in particular in conjunction with the four-joint coupling mechanism or points of articulation described below can be understood in general, within the context of this application, as meaning an articulated connection, such as, for example, a film hinge or a film joint.

Advantageous refinements which can be used individually or in combination with one another are described below.

The four-joint coupling mechanism can be defined by a frame, a first link, a second link and a fastening portion coupled to the two links. The frame can be defined by the covering portion, in particular by a first point of articulation and a second point of articulation. An upper connecting point of the fastening portion to the first link can define a third point of articulation. A lower connecting point of the fastening portion to the second link can define a fourth point of articulation. The fastening portion can be connected to the covering portion by the first link and the second link.

The end cap can be elastically deformable at least in sections. A fastening point can be part of the fastening portion of the end cap. In the region of the fastening point, a protrusion can protrude laterally, in particular parallel to a transverse direction, said protrusion being able to be brought into contact with an edge region of an opening of the first rail. The protrusion can have a curved contour in the direction of the covering portion of the end cap.

The object is furthermore achieved according to the invention by a longitudinal adjuster, in particular for a vehicle seat, having at least one pair of rails which is formed from a first rail and a second rail guided displaceably in the longitudinal direction relative to the first rail, wherein at least the first rail or the second rail has at least one opening for the fastening of an end cap for an end of the respective rail, wherein the longitudinal adjuster has an end cap fastened in the opening in accordance with the description above.

The edge region of the opening can have an arched contour.

DESCRIPTION OF THE FIGURES

Before refinements of the invention are described in greater detail below using figures, it should first of all be noted that the invention is not restricted to the described components or the described method steps. Furthermore, the terminology which is used is also not of a restrictive nature, but rather as merely an exemplary character. If the singular is used below in the description and the claims, the plural is included in each case, insofar as the context does not explicitly rule this out.

The invention is explained in more detail below with reference to advantageous exemplary embodiments which are illustrated in the figures. However, the invention is not restricted to these exemplary embodiments. In the figures.

DETAILED DESCRIPTION

A vehicle seat 1 which is illustrated schematically in FIG. 1 will be described below using three spatial directions running perpendicularly to one another. With a vehicle seat 1 installed in the vehicle, a longitudinal direction x runs substantially horizontally and preferably parallel to a vehicle longitudinal direction which corresponds to the customary direction of travel of the vehicle. A transverse direction y running perpendicularly to the longitudinal direction x is likewise oriented horizontally in the vehicle and runs parallel to a vehicle transverse direction. A vertical direction z runs perpendicularly to the longitudinal direction x and perpendicularly to the transverse direction y. With a vehicle seat 1 installed in the vehicle, the vertical direction z runs parallel to the vehicle vertical axis.

The position specifications and direction specifications used, such as for example front, rear, top and bottom, relate to a viewing direction of an occupant seated in a seat part 2 of the vehicle seat 1 in a normal seat position, wherein the vehicle seat 1 is installed in the vehicle and is oriented in a use position suitable for passenger transport, with an upright backrest 4 and in the direction of travel as customary.

However, the vehicle seat 1 according to the invention may also be installed in a different orientation, for example transversely with respect to the direction of travel.

Figure 1:
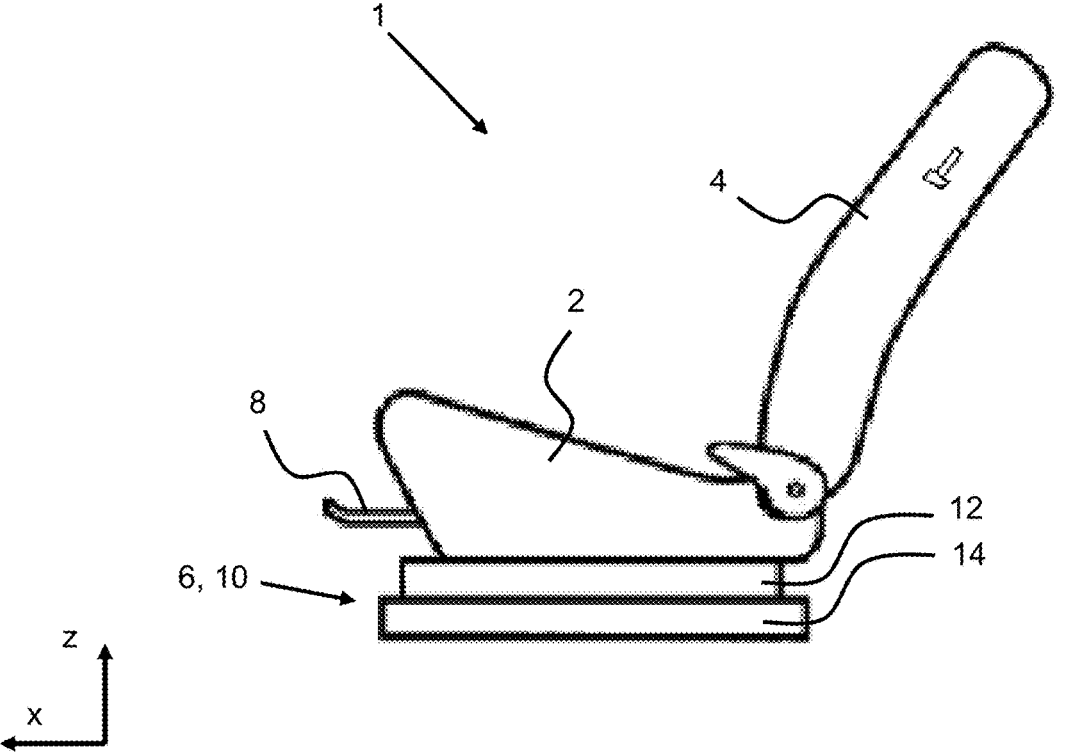
FIG. 1: shows a schematic illustration of a vehicle seat having a longitudinal adjuster according to the invention.

The vehicle seat 1 shown in FIG. 1 for a motor vehicle has the seat part 2 and the backrest 4 which is adjustable in its inclination relative to the seat part 2. An inclination of the backrest 4 can be adjustable, for example, by a latching fitting or a geared fitting. The vehicle seat 1 is mounted on a longitudinal adjuster 6 for adjusting a longitudinal position of the seat.

Figure 2:
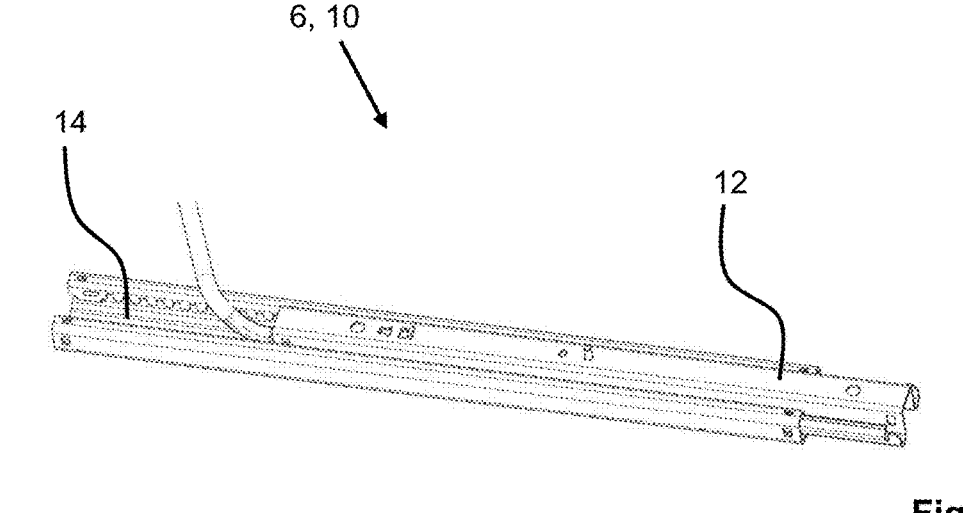
FIG. 2 shows a schematic illustration of a pair of rails of the longitudinal adjuster.

FIG. 2 shows a schematic illustration of a pair of rails 10 of the longitudinal adjuster 6. The pair of rails 10 is formed from a first rail 12, in the present case a first rail 12 which is connected to the vehicle seat 1 and may also be referred to as the upper rail, and a second rail 14, in the present case a second rail 14 which is connectable to a vehicle structure and may also be referred to as a lower rail. A locking device can be arranged in a cavity formed between the first rail 12 and the second rail 14.

The locking device is actuable by an actuating lever 8. A construction and a function of devices for actuating the locking device, in particular for moving a locking plate of the locking device into a release position or a locking position, are fundamentally known. In this respect, reference is made by way of example to DE 10 2010 049 542 A1 and DE 10 2014 219 868 A1, the disclosure of which in this regard is expressly incorporated.

Figure 3:
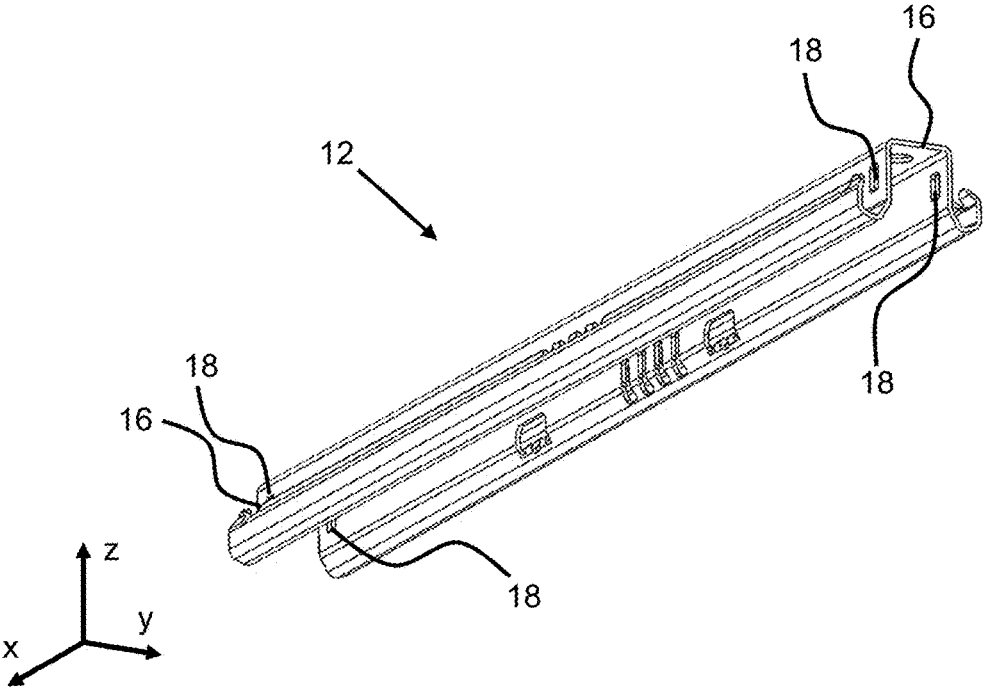
FIG. 3 shows a perspective illustration of a first rail of the pair of rails from FIG. 2.

FIG. 3 shows the first rail 12 of the pair of rails 10. The first rail 12 has a respective opening 18 in the substantially vertically running flanks in the region of its two end-face ends 16 that are opposite in the longitudinal direction x. As shown, for example, in FIG. 4, the openings 18 are configured such that a protrusion 26 of an end cap 20 engages in a respective opening 18 in order to secure the end cap 20 on the first rail 12. The end cap 20 covers the end face of an end region of the first rail 12. A corresponding end cap 20 can likewise be arranged on an end face of an end region of the second rail 14. The openings 18 provided for the fastening of the end cap 20 are preferably provided in pairs and symmetrically with respect to a plane perpendicular to the transverse direction y in the respective rail 12, 14. The protrusions 26 provided for the fastening of the end cap 20 are preferably likewise provided in pairs and symmetrically with respect to a plane perpendicular to the transverse direction y on the end cap 20.

Figure 4:
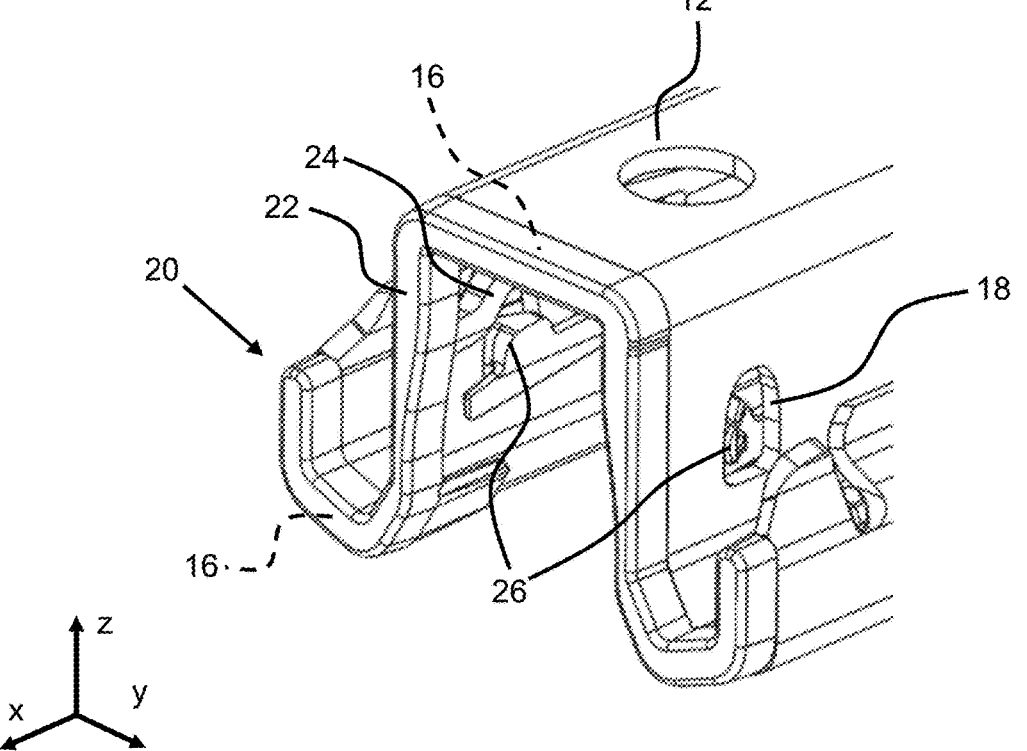
FIG. 4 shows a perspective illustration of a first end of the first rail with an end cap according to a first exemplary embodiment.
Figure 5:
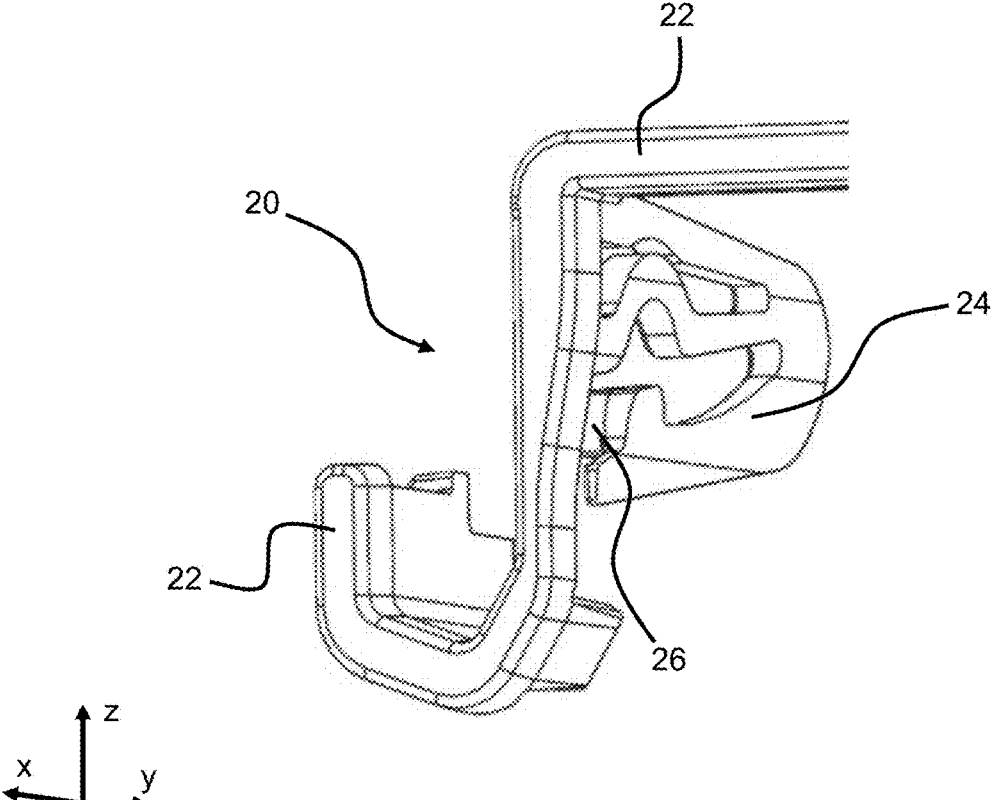
FIG. 5 shows part of a perspective illustration of the end cap from FIG. 4.

FIG. 4 shows an end cap 20 according to a first exemplary embodiment at one end 16 of a first rail 12 and FIG. 5 shows part of the end cap 20 from FIG. 4 without the first rail 12. The end cap 20 is preferably manufactured from plastic. The end cap 20 is preferably elastically deformable at least in sections. The end cap 20 has an esthetic function and also protects against injuries.

Figure 6:
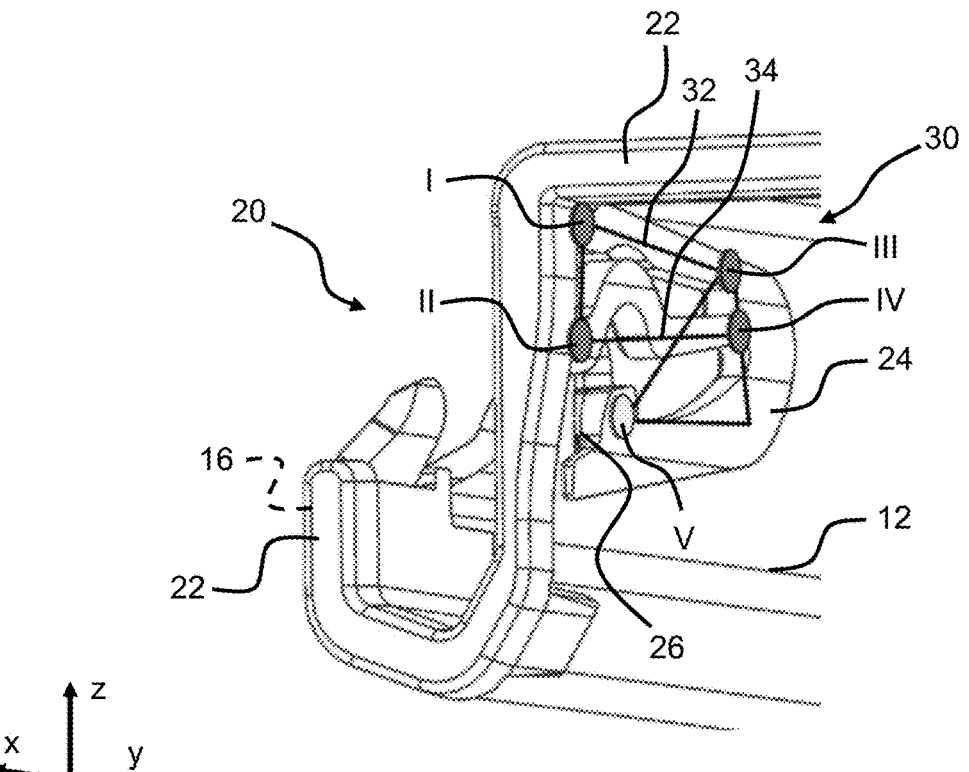
FIG. 6 shows part of a perspective illustration of the first rail with the end cap from FIG. 4.

FIG. 6 shows a schematic manner of operation of a four-joint coupling mechanism 30 in the case of the end cap 20 from FIG. 4 according to the first exemplary embodiment.

A fastening point V is part of the fastening portion 24. In the region of the fastening point V, a protrusion 26 protrudes laterally, in particular parallel to the transverse direction y, said protrusion being able to be brought into contact with an edge region of the opening 18 of the first rail 12.

The fastening point V follows a coupling curve which is customary for such four-joint coupling mechanisms. Said coupling curve can be definable in a manner corresponding to the requirements, by a respectively adapted length of the first link 32 and of the second link 34 and of a distance between the respective first point of articulation I and second point of articulation II, in which the first link 32 and the second link 34 are each connected to the covering portion 22, or of a distance between the respective third point of articulation III and the fourth point of articulation IV, in which the first link 32 and the second link 34 are each connected to the fastening portion 24. That portion of the fastening portion 24 which forms the first link 32 can in particular have a different contour or shape or a different profile, as can that portion of the fastening portion 24 which forms the second link 34. The four-joint coupling mechanism 30 can thereby be influenceable once again in its elastic properties.

Figure 7:
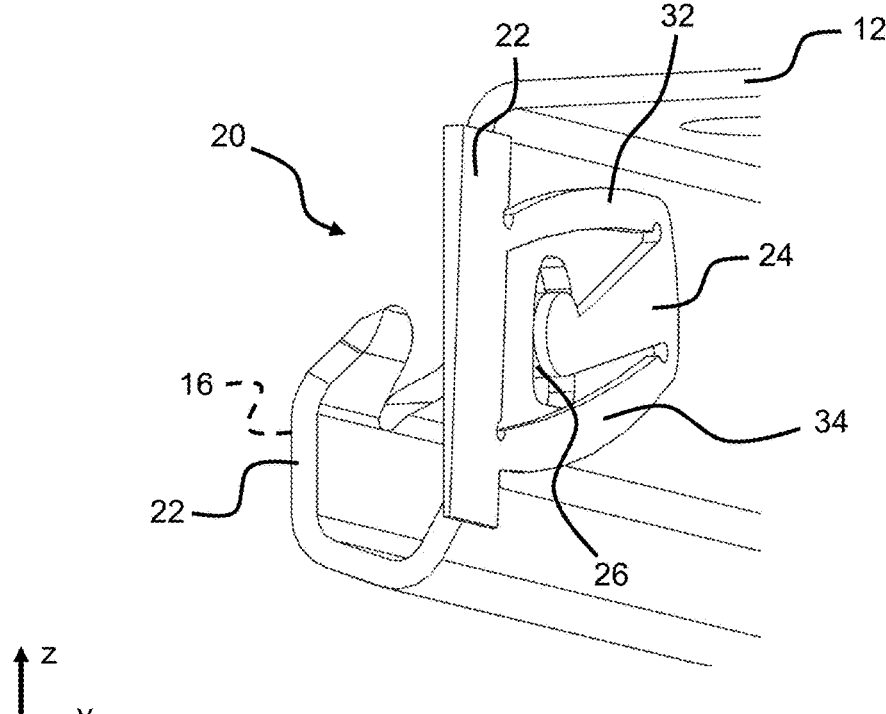
FIG. 7 shows part of a perspective illustration of a first end of the first rail with an end cap according to a second exemplary embodiment.
Figure 8:
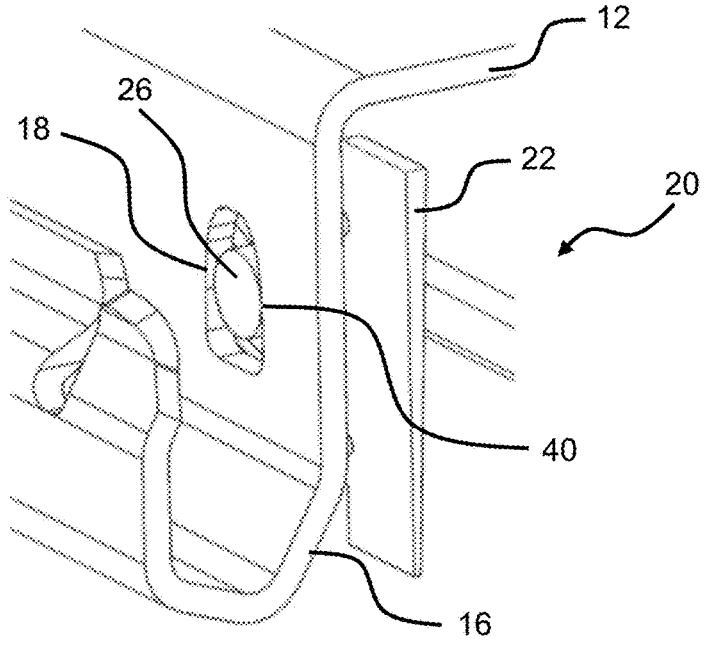
FIG. 8 shows part of a perspective illustration of the first rail with the end cap from FIG. 7.

FIGS. 7 and 8 show an end cap 20 according to a second exemplary embodiment at the end 16 of the first rail 12 from different viewing angles. The covering portion 22 of the end cap 20 according to the second exemplary embodiment is illustrated here merely in an abstract sketch. The end cap 20 according to the second exemplary embodiment preferably has the same shape of the covering region 22 adapted to the respective profile shape of the first rail 12 or second rail 14, as is shown with reference to the end cap 20 according to the first exemplary embodiment.

Compensation for tolerances of a distance between an edge region of the opening 18 and the end 16 of the first rail 12 can be improved or further influenced by an arched contour of the edge region of the opening 18.

FIG. 8 shows a contact surface 40 between the end cap 20, in particular the protrusion 26 of the end cap 20, and the edge region of the opening 18. Said edge region can have a curved contour. The protrusion 26 can have a curved contour in the direction of the covering portion 22 of the end cap 20. Tolerances are compensated for by a spring force of the protrusion 26 or a material-induced resilient property of the entire fastening portion 24 of the end cap 20.

During a mounting of the end caps 20, the protrusions 26 first of all have to be actively pretensioned inward from a starting plane parallel to the transverse direction y such that the fastening portion 24 can be guided past the respective portions of the profile of the first rail 12 or of the second rail 14. After the end cap 20 is attached to the end-face end 16, the protrusions 26 have to be moved downward or upward parallel to the vertical direction z, as a result of which they are tensioned in a spring-elastic manner because of the elasticity properties of the four-joint coupling mechanism 30 defined in the fastening portion 24.

The pretensioning of the fastening portion 24 parallel to the transverse direction y first of all ensures that the protrusion 26 reliably drops into the respectively cooperating opening 18 of the first rail 12 or second rail 14 and is secured in the opening 18. The further pretensioning of the protrusion 26 downward or upward parallel to the vertical direction z likewise drives the protrusion 26 again in the opening 18 along its coupling curve in the direction of its original position, with the protrusion 26 being supported on the edge region of the opening 18 and thereby reducing play between the covering portion 22 and the end side of the first rail 12 or of the second rail 14. Expressed in other words, a play-free position of the end cap 20 is achieved by interaction essentially of the opening 18, in particular the edge region of the opening 18, together with the pretensioning of the protrusion 26, in particular a resilient force of the protrusion 26, and the respective coupling curve.

For simpler installation of the end cap 20, an auxiliary tool can, in particular in the form of a wedge, which can be supported on an upper surface of the inner profile in order to pretension the protrusion 26 of the end cap 20 during the attaching operation.

Figure 9:
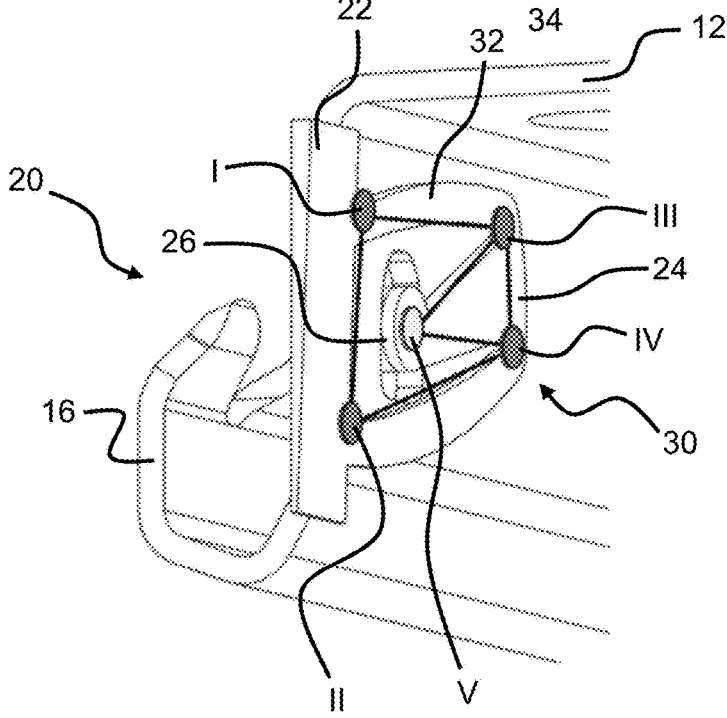
FIG. 9 shows a perspective illustration of the end of the first rail with the end cap from FIG. 7.

FIG. 9 shows a schematic manner of operation of a four-joint coupling mechanism 30 in the case of the end cap 20 from FIG. 7 according to the second exemplary embodiment.

The fastening point V is part of the fastening portion 24. In the region of the fastening point V, a protrusion 26 protrudes laterally, in particular parallel to the transverse direction y, said protrusion being able to be brought into contact with an edge region of the opening 18 of the first rail 12.

The fastening point V follows a coupling curve which is customary for such four-joint coupling mechanisms. Said coupling curve is able to correspond to the requirements by a respectively adapted length of the first link 32 and of the second link 34 and a distance between the respective first point of articulation I and second point of articulation II, in which the first link 32 and second link 34 are each connected to the covering portion 22.

The object of the fastening portions 24 consists in pretensioning the end cap 20, in particular the covering portion 22 of the end cap 20, in the direction of the respective end-face end 16 of the first rail 12 or second rail 14.

The features which are disclosed in the above description, the claims and the drawings may be of significance both individually and in combination for implementing the invention in its various refinements.

Although the invention has been described in detail in the drawings and the preceding description, the descriptions should be understood as being illustrative and exemplary and not restrictive. In particular, the choice of the graphically illustrated proportions of the individual elements should not be interpreted as required or restrictive. Furthermore, the invention is in particular not restricted to the exemplary embodiments explained. Further variants of the invention and the implementation thereof are apparent to a person skilled in the art from the preceding disclosure, the figures and the claims.

Terms such as "comprise", "have", "include", "contain" and the like which are used in the claims do not rule out further elements or steps. The use of the indefinite article does not rule out a plural. A single device can carry out the functions of a plurality of units or devices mentioned in the claims.

LIST OF REFERENCE SIGNS

1 Vehicle seat
2 Seat part
4 Backrest
6 Longitudinal adjuster
8 Actuating lever
10 Pair of rails
12 First rail
14 Second rail
16 End
18 Opening
20 End cap
22 Covering portion
24 Fastening portion

26 Protrusion
30 Four-joint coupling mechanism
32 First link
34 Second link
40 Contact surface
I First point of articulation
II Second point of articulation
III Third point of articulation
IV Fourth point of articulation
V Fastening point
x Longitudinal direction
y Transverse direction
z Vertical direction

The invention claimed is:

1. An end cap for a rail of a longitudinal adjuster, wherein the end cap has a covering portion, for covering an end-face end of the rail, and a fastening portion, for fastening the end cap to the rail, wherein the fastening portion is connected to the covering portion through a four-joint coupling mechanism, wherein the four-joint coupling mechanism is defined by a frame, a first link, a second link and the fastening portion which connects the first link and the second link to one another.

2. The end cap as claimed in claim 1, wherein an upper connecting point of the first link to the frame defines a first point of articulation.

3. The end cap as claimed in claim 2, wherein a lower connecting point of the second link to the frame defines a second point of articulation.

4. The end cap as claimed in claim 3, wherein an upper connecting point of the fastening portion to the first link defines a third point of articulation.

5. The end cap as claimed in claim 4, wherein a lower connecting point of the fastening portion to the second link defines a fourth point of articulation.

6. The end cap as claimed in claim 1, wherein an upper connecting point of the fastening portion is connected to the covering portion by the first link.

7. The end cap as claimed in claim 1, wherein a lower connecting point of the fastening portion is connected to the covering portion by the second link.

8. The end cap as claimed in claim 1, wherein the frame is defined by the covering portion.

9. The end cap as claimed in claim 1, wherein the end cap is elastically deformable at least in sections.

10. The end cap as claimed in claim 1, wherein a fastening point is part of the fastening portion of the end cap.

11. The end cap as claimed in claim 10, wherein, in a region of the fastening point, a protrusion protrudes laterally, including parallel to a transverse direction, said protrusion being able to be brought into contact with an edge region of an opening of the first rail.

12. The end cap as claimed in claim 11, wherein the protrusion has a curved contour extending towards the covering portion of the end cap.

13. A longitudinal adjuster for a vehicle seat, having at least one pair of rails which is formed from a first rail and a second rail guided displaceably in the longitudinal direction relative to the first rail, wherein at least the first rail or the second rail has at least one opening for the fastening of an end cap for an end of either the first rail or the second rail, wherein the longitudinal adjuster has the end cap of claim 1.

14. The longitudinal adjuster as claimed in claim 13, wherein an edge region of the opening has an arched contour.

15. An end cap for a rail of a longitudinal adjuster, wherein the end cap has a covering portion, for covering an end-face end of the rail, and a fastening portion, for fastening the end cap to the rail, wherein the fastening portion is connected to the covering portion with A formation of a coupling mechanism, wherein an upper connecting point of A first link to a frame defines a first point of articulation, wherein a lower connecting point of A second link to the frame defines a second point of articulation, and wherein an upper connecting point of the fastening portion to the first link defines a third point of articulation.

\* \* \* \* \*